United States Patent
Kwasniewski

[11] Patent Number: 5,370,018
[45] Date of Patent: Dec. 6, 1994

[54] INTERNALLY VENTED INTERAXLE DIFFERENTIAL ASSEMBLY LOCKOUT SHIFT UNIT

[75] Inventor: Dale L. Kwasniewski, Kalamazoo, Mich.

[73] Assignee: Eaton Corporation, Cleveland, Ohio

[21] Appl. No.: 25,454

[22] Filed: Mar. 3, 1993

[51] Int. Cl.$^5$ ............................................. F16H 57/02
[52] U.S. Cl. .............................. 74/606 R; 475/200; 180/24.09
[58] Field of Search ..................... 74/606 R, 607; 475/200-204, 198, 210, 213, 109; 180/24.09, 111, 381, 375, 378, 380

[56] References Cited

U.S. PATENT DOCUMENTS

| | | | |
|---|---|---|---|
| 3,000,456 | 9/1961 | Christie | 180/22 |
| 3,916,728 | 11/1975 | Behar | 74/711 |
| 3,929,200 | 12/1975 | Behar | 180/49 |
| 4,050,534 | 9/1977 | Nelson | 180/24.09 |
| 4,263,824 | 4/1981 | Mueller . | |
| 4,283,968 | 8/1981 | Kalns | 475/200 X |
| 4,319,499 | 3/1982 | Sanui et al. | 475/200 |
| 4,856,167 | 8/1989 | Sabroff et al. | 29/159.2 |
| 5,046,994 | 9/1991 | Hasegawa et al. | 475/200 X |
| 5,066,266 | 11/1991 | Kobayashi | 475/200 X |
| 5,090,949 | 2/1992 | Thoma et al. | 475/200 X |
| 5,098,352 | 3/1992 | Montanaro et al. | 475/200 X |
| 5,129,285 | 7/1992 | Sugano et al. | 475/200 X |
| 5,257,962 | 11/1993 | Martin et al. | 74/606 R X |

OTHER PUBLICATIONS

Eaton Corporation Part No. 111458 Reversed Air Type Shift Assembly.

Primary Examiner—Vinh T. Luong
Attorney, Agent, or Firm—Howard D. Gordon

[57] ABSTRACT

A shift unit (60) for a tandem drive axle (10) interaxle differential lockout clutch (48) is provided. The shift unit includes an actuator piston (72) dividing a cylinder (78) into a constantly open chamber (80) and a selectively pressurized and exhausted chamber (82). The constantly open chamber (80) is in constant fluid communication with a protected relatively clean pocket of air (62) located within the power divider portion (26A) of the drive axle housing (26).

11 Claims, 4 Drawing Sheets

INTERNALLY VENTED INTERAXLE DIFFERENTIAL ASSEMBLY LOCKOUT SHIFT UNIT

BACKGROUND OF THE INVENTION

1. Field of the Invention

The present invention relates to an interaxle differential lockout shift unit for a tandem drive axle assembly, and more particularly, relates to a pneumatically actuated interaxle differential lockout shift unit which includes at least one piston chamber which is vented internally of the drive axle assembly housing.

2. Description of the Prior Art

Tandem drive axle systems for vehicles, such as heavy duty trucks, are well known in the prior art. The essence of a tandem drive axle assembly is its ability to drive more than one drive axle, generally two or three rear drive axles. This is typically accomplished by means of a power (or torque) divider, usually a differential, in which one of the differential side gears transmits a certain percentage of the input torque to the first drive axle while the other differential side gear transmits the remaining torque by means of an output shaft to a subsequent axle assembly including a second drive axle. A tandem axle assembly of this well known in the art type is illustrated in U.S. Pat. No. 3,000,456, assigned to the assignee of the present invention and incorporated herein by reference.

The power divider differential, usually referred to as an "interaxle differential", is usually provided with a selectively engagable and disengagable interaxle differential lockout clutch and a lockout shift unit for selectively engaging and disengaging the clutch. Typically the lockout clutch is jaw clutch and the shift unit is pneumatically actuated from a spring biased first position to an pneumatically maintained second position.

Tandem axle power dividers of this type are well known in the prior art as may be seen by reference to U.S. Pat. Nos. 3,916,728; 3,929,200 and 4,050,534, all assigned to the assignee of this invention and the disclosures of which are all incorporated herein by reference.

While the prior art tandem drive axle systems, and the interaxle differential lockout shift units used therewith, are widely used and very commercially successful, they are not totally satisfactory as the shift units, usually mounted on the front-rear axle housing, are vented to atmosphere and thus prone to blockage from airborne contamination which can prevent or inhibit the shift units from properly functioning. Further, venting and drawing from atmosphere at the exterior of an axle housing allows corrosive matter, such as road salt and the like, to be drawn into the shift unit.

SUMMARY OF THE INVENTION

In accordance with the present invention, the drawbacks of the prior art are minimized or eliminated by the provision of a spring applied, pneumatically released, interaxle differential lockout shift unit which includes a variable volume piston chamber constantly communicating with the relatively protected interior of the tandem axle power divider housing wherefrom relatively contaminant free air for the chamber may be drawn into and exhausted from the chamber.

The above is accomplished by providing an actuator or shift unit which is mounted on or inside of the power divider housing and has a piston chamber constantly open to the air space within the housing. In the preferred embodiment, the interaxle differential lockout clutch is controlled by a shift fork mounted to a push rod carried by a spring biased pneumatic piston. The open chamber defined by one side of the piston communicates to the housing air space through an axially extending through bore in the push rod.

Accordingly, it is an object of the present invention to provide a new and improved pneumatic shift unit for a tandem axle interaxle differential lockout.

This and other objects and advantages of the present invention will become apparent from a reading of the detailed description of the preferred embodiment taken with the attached drawing.

DESCRIPTION OF THE PREFERRED EMBODIMENT

Figure 1:
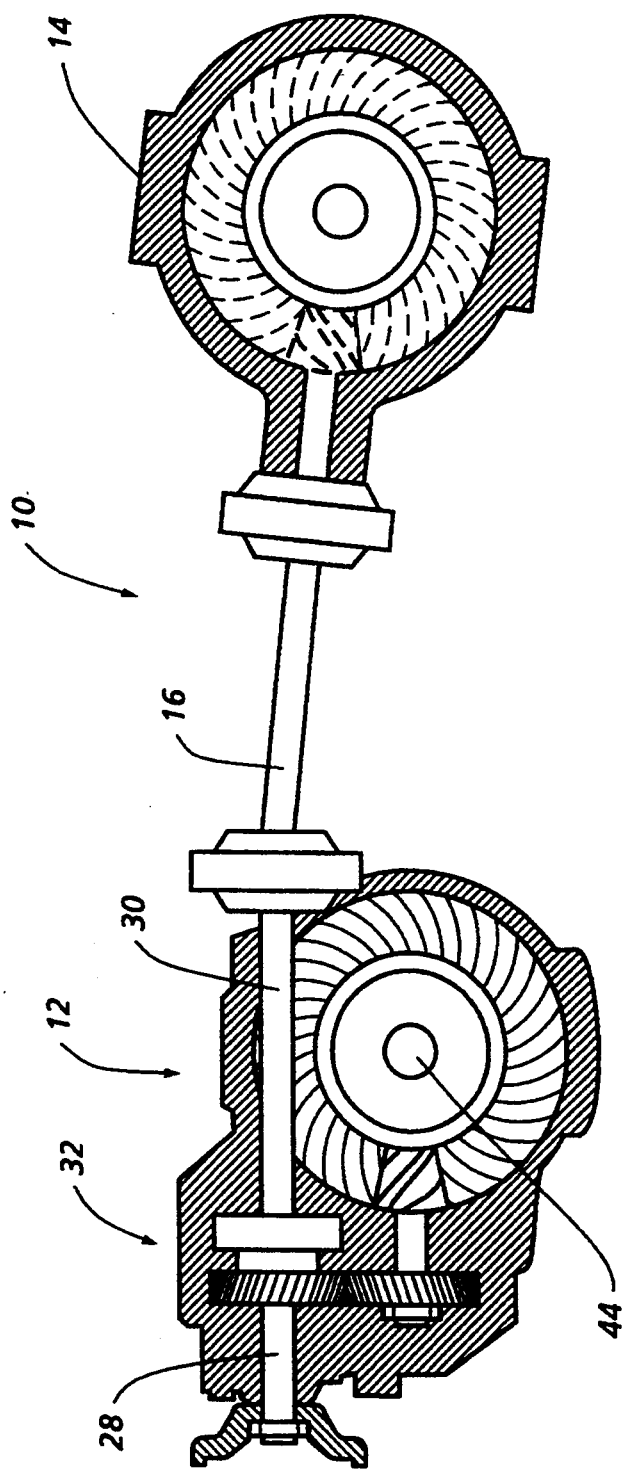
FIG. 1 is a schematic illustration of a tandem rear drive axle system.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectfully to the left and right sides of the transmission as illustrated in FIGS. 1 and 12. The words "inwardly" and "outwardly" will refer to directions toward and away from, respectively, the geometric center of the device and designated parts thereof. Said terminology includes the words above specifically mentioned, derivatives thereof and words of similar import.

A schematic illustration of a rear tandem drive axle system 10 may be seen by reference to FIG. 1. The system includes a front-rear drive axle 12, described in greater detail below, and a rear-rear drive axle 14. A stub shaft 16 extends from an output shaft driven by the power divider in the front-rear drive axle 12 to the input shaft of the rear-rear drive axle 14. The structure and function of rear-rear drive axle 14 is well known in the art and may be appreciated by reference to U.S. Pat. Nos. 4,263,824 and 4,856,167, the disclosures of which are incorporated herein by reference.

Figure 2:
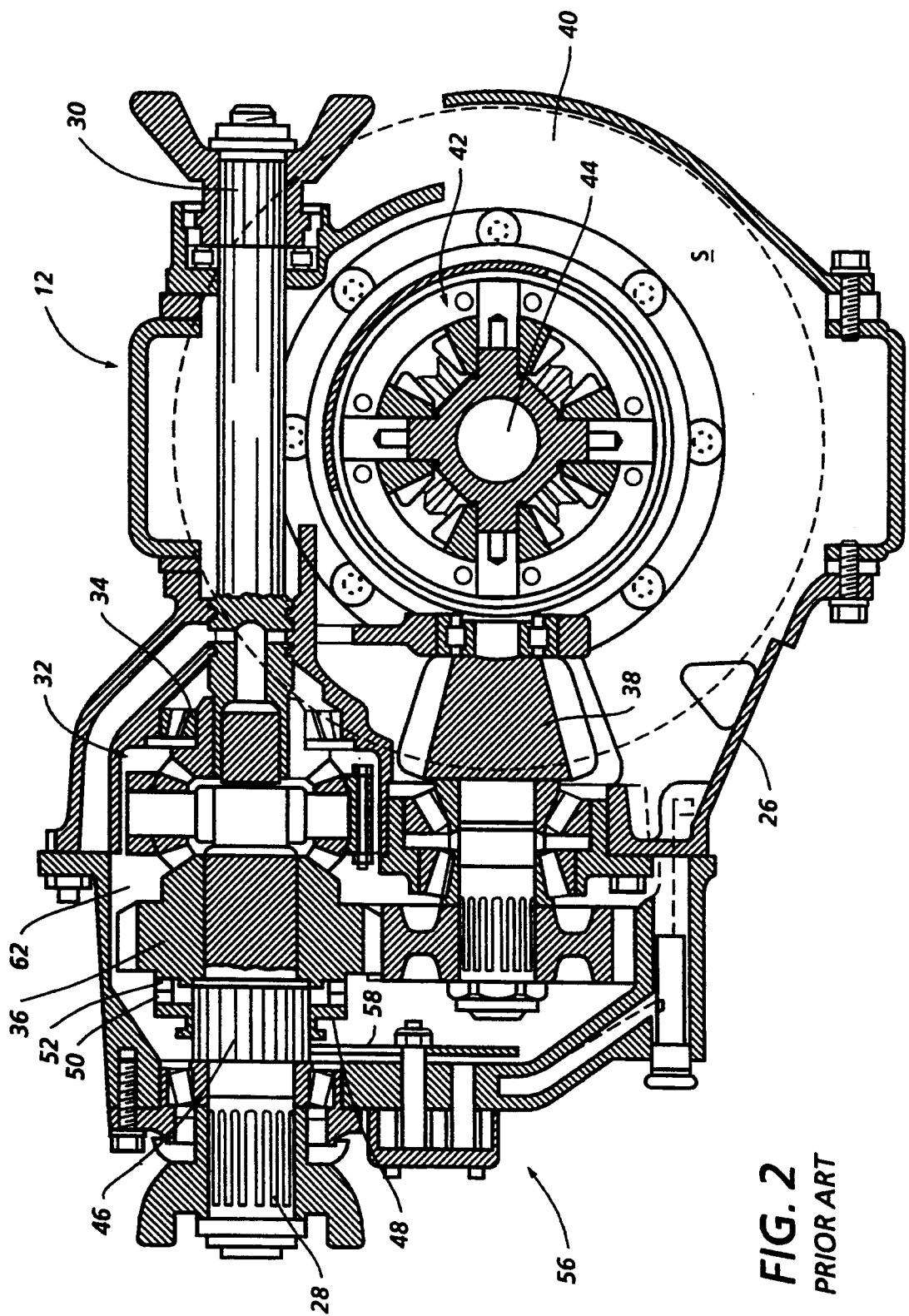
FIG. 2 is a partial elevational view, in section, of a front-rear drive axle of a tandem rear drive axle assembly.

The structure and function of front-rear tandem drive axle 12 is well known and may be seen in greater detail by reference to FIG. 2. Briefly, axle assembly 12 comprises a multiple-piece housing 26 within which are rotatably supported input shaft 28 and axially aligned output shaft 30. Output shaft 30 is rotatably connected to stub shift 16 by a universal joint or the like. Input shaft 28 drives an interaxle differential assembly 32 having a first side gear output member 34 drivingly connected to output shaft 30 and a second side gear output member 36 for driving the front-rear axle assembly drive gearing set which, as is well known in the prior art, comprises a drive pinion 38, a ring gear 40 and an inter-axle differential assembly 42, the side gears of which drive the axle shafts 44. The input shaft 28 further includes an intermediate spline portion 46 on which is slidably mounted a clutch member 48 which has, extending rearwardly, a set of clutch teeth 50 for engagement with a mating set of clutch teeth 52 provided on the forward face on the differential side gear 36. When clutch 48 is moved rightwardly causing clutch teeth 50 and 52 to engage, the side gear 36 will be rotationally fixed to the input shaft 28 effectively locking-up/locking-out the interaxle differential 32. A lubricant pump mechanism is illustrated generally at 56 and includes a shaft having a gear driven off portion 46 of the input shaft 28. The pump has an inlet in fluid connection with a lubricant sump S.

Figure 3:
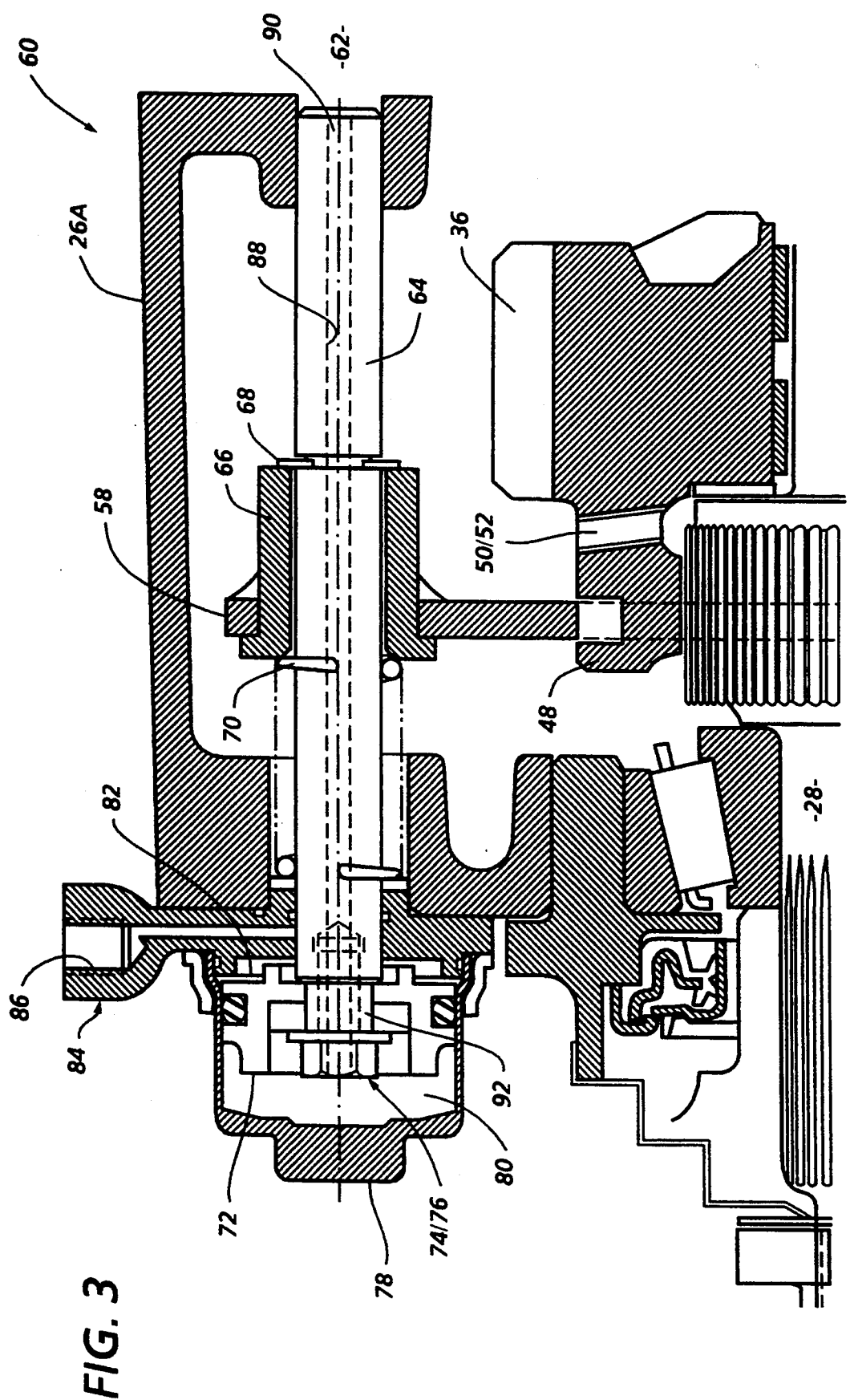
FIG. 3 is a sectional view of the interaxle differential lockout shift unit of the present invention.
Figure 4:
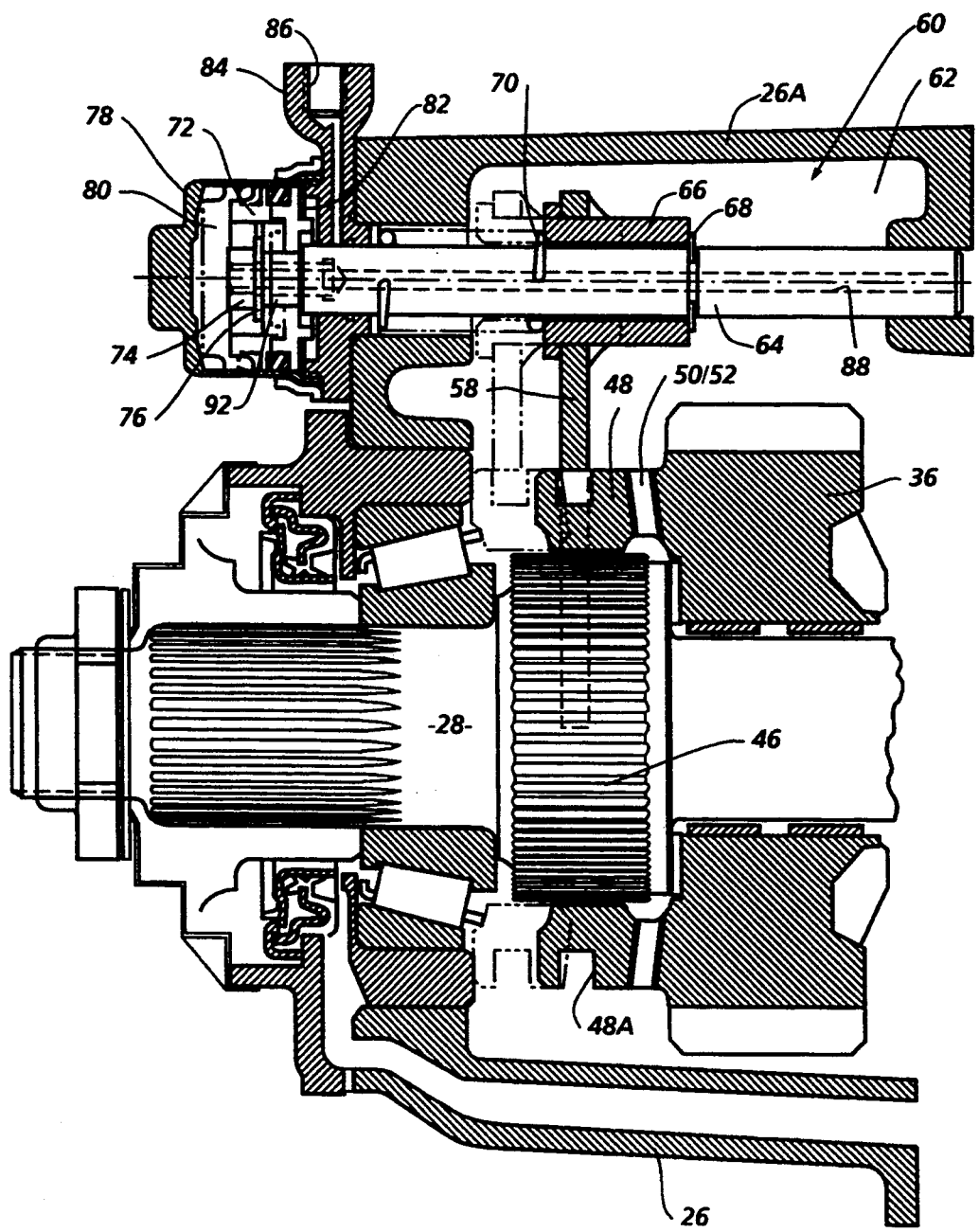
FIG. 4 is an enlarged view, in section, of the shift unit of FIG. 3 as assembled to the power divider section of the front-rear axle.

The interaxle differential shift unit 60 of the present invention is illustrated in FIGS. 3 and 4. Elements illustrated in FIGS. 3 and/or 4 having the same, or substantially the same, structure and function as elements illustrated in FIGS. 1 and/or 2 will be assigned like reference numerals.

In FIGS. 3 and 4, the power divider portion 26A of the axle housing 26 is illustrated. Lockout clutch 48 is illustrated in its rightwardmost axial position relative to input shaft 28 which causes clutch teeth 50 and 52 to engage for locking out the interaxle differential 32. As is known, locking of the tandem axle interaxle differential 32 will, under certain operating conditions, provide improved vehicle tractive effort. The axial positioning of clutch 48 is controlled by shift fork 58 received in annular groove 48A of the clutch.

The interaxle differential lockout shift unit 60 of the present invention is illustrated as a "reverse air" type unit as it will spring bias the clutch 48 to the engaged position and requires pneumatic force to move clutch 48 leftwardly to the disengaged position. The present invention is equally applicable to a standard or "non-reverse air" type shift unit wherein the clutch 48 will be spring biased leftwardly to unlock the interaxle differential and will require pneumatic force to move clutch 48 rightwardly to its engaged/lockout position.

As seen in FIGS. 2, 3 and 4, the housing 26 defines an internal air cavity 62, located well above the lubricant sumps, which is relatively well protected and in which relatively contaminant and corrosive free air is located. The structure of shift unit 60 allows the shift unit to draw air from, and exhaust air to, the relatively clean protected air in cavity 62 as compared to the prior art shift unit structures which drew air from and exhausted air to the relatively harsh atmosphere (water, sand, dust, mud, salt, etc.) often surrounding the exterior of a heavy duty vehicular drive axle.

The shift unit 60 includes an axially movable push rod 64 on which bushing 66 defining a hub of the shift fork 58 is received. Push rod extends inwardly into the interior of housing 26 and is supported for limited axial movement in housing portion 26A. A snap ring 68 limits rightward movement of bushing 66 relative to the shaft and a compression spring 70 biases the bushing into the snap ring and biases the push rod 64, shift fork 58 and clutch 48 rightwardly in housing 60, A piston/O-ring assembly 72 is fixed to the push rod by a cap screw 74 and washer 76. The piston/O-ring assembly is received in a cylinder housing 78 fixed to or integral with the housing 26A. The cylinder housing is divided into a variable volume constantly open chamber 80 and a selectively pressurized and exhausted chamber 82 by the piston 72 which is slidably and sealingly received therein.

A manifold assembly 84 having a threaded connector 86 provides a fluid connection to selectively pressurized/exhausted chamber 82. Selective pressurization of chamber 82, to disengage the lockup clutch 48, and exhaust of chamber 82, to engage the lockup clutch, may be accomplished by a manually operated two-position, three-way valve connected to an on-board source of pressurized air, to an exhaust and to manifold connector 86. Such manual controls are, of course, well known in the prior art as may be seen by reference to U.S. Pat. No. 4,432,431 the disclosure of which is incorporated herein by reference.

As may be seen, for proper operation of the shift unit 60, air must be freely ingested into chamber 80 as the piston/push rod assembly moves rightwardly and must be freely expelled from chamber 80 as the piston/push rod assembly moves leftwardly. To accomplish this, push rod 64 is hollow defining an axially extending through bore 88 having an opening 90 to the inner air space 62 at the inner end thereof and receiving the cap screw 74 at the outer end thereof. Cap screw 74 also defines a bore 92 extending from bore 88 to open chamber 80. Accordingly, variable volume open chamber 80 is in fluid communication with the protected air cavity 62 defined inside the power divider portion 26A of front-rear axle housing 26 by means of bores 88 and 92. Chamber 80 thus "breathes" the relatively contaminant and corrosive free air available in space 62 which will minimize possible clogging of air passages and/or corrosion of the shift unit inner components.

Although the present invention has been set forth with a certain degree of particularity, it is understood the various modifications are possible without departing from the spirit and scope of the invention as hereinafter claimed.

I claim:

1. In combination a differential lockup clutch (48) of a tandem-axle, front-rear-drive axle assembly (12) and a shift unit (60) for shifting said lockup clutch between engaged and disengaged positions thereof, said front-rear drive axle assembly including an upper housing portion (26A) defining an interior air cavity (62), said shift unit including a cylinder (78) divided into a first variable volume constantly open chamber (80) and a second selectively pressurized and exhausted chamber (82) by an actuator piston (72) axially fixed to a push rod (64) carrying a shift fork (58) for axially positioning said lockup clutch (48), spring biasing said piston, push rod, shift fork and lockup clutch towards one of said engaged and disengaged positions and pressurization of said second chamber effective to move said piston, push rod, shift fork and lockup clutch against said bias towards the other of said engaged and disengaged positions, said lockup clutch and shift unit combination characterized by:

said first chamber (80) in constant pneumatic communication with said interior air cavity (62).

2. The shift unit of claim 1 wherein said push rod (64) extends into said interior air cavity (62), said push rod including an axially extending bore (88) providing fluid communication between said first chamber (80) and said interior air cavity (62).

3. The shift unit of claim 2 wherein said one position is said engaged position.

4. The shift unit of claim 2 wherein a manifold (84) having an exterior connection 86 is provided for fluidly connecting said second chamber (82) to a selectively pressurized and exhausted exterior conduit.

5. The shift unit of claim 2 wherein said drive axle assembly includes a lower axle housing portion defining a lubricant sump (S), said interior air cavity (62) located above said sump.

6. The shift unit of claim 1 wherein said one position is said engaged position.

7. The shift unit of claim 6 wherein a manifold (84) having an exterior connection 86 is provided for fluidly connecting said second chamber (82) to a selectively pressurized and exhausted exterior conduit.

8. The shift unit of claim 6 wherein said drive axle assembly includes a lower axle housing portion defining a lubricant sump (S), said interior air cavity (62) located above said sump.

9. The shift unit of claim 1 wherein a manifold (84) having an exterior connection 86 is provided for fluidly connecting said second chamber (82) to a selectively pressurized and exhausted exterior conduit.

10. The shift unit of claim 9 wherein said drive axle assembly includes a lower axle housing portion defining a lubricant sump (S), said interior air cavity (62) located above said sump.

11. The shift unit of claim 1 wherein said drive axle assembly includes a lower axle housing portion defining a lubricant sump (S), said interior air cavity (62) located above said sump.

* * * * *